No. 891,571.
PATENTED JUNE 23, 1908.
L. STOCKER.
MACHINE FOR MAKING MOPS AND BRUSHES.
APPLICATION FILED SEPT. 17, 1906.
6 SHEETS—SHEET 2.
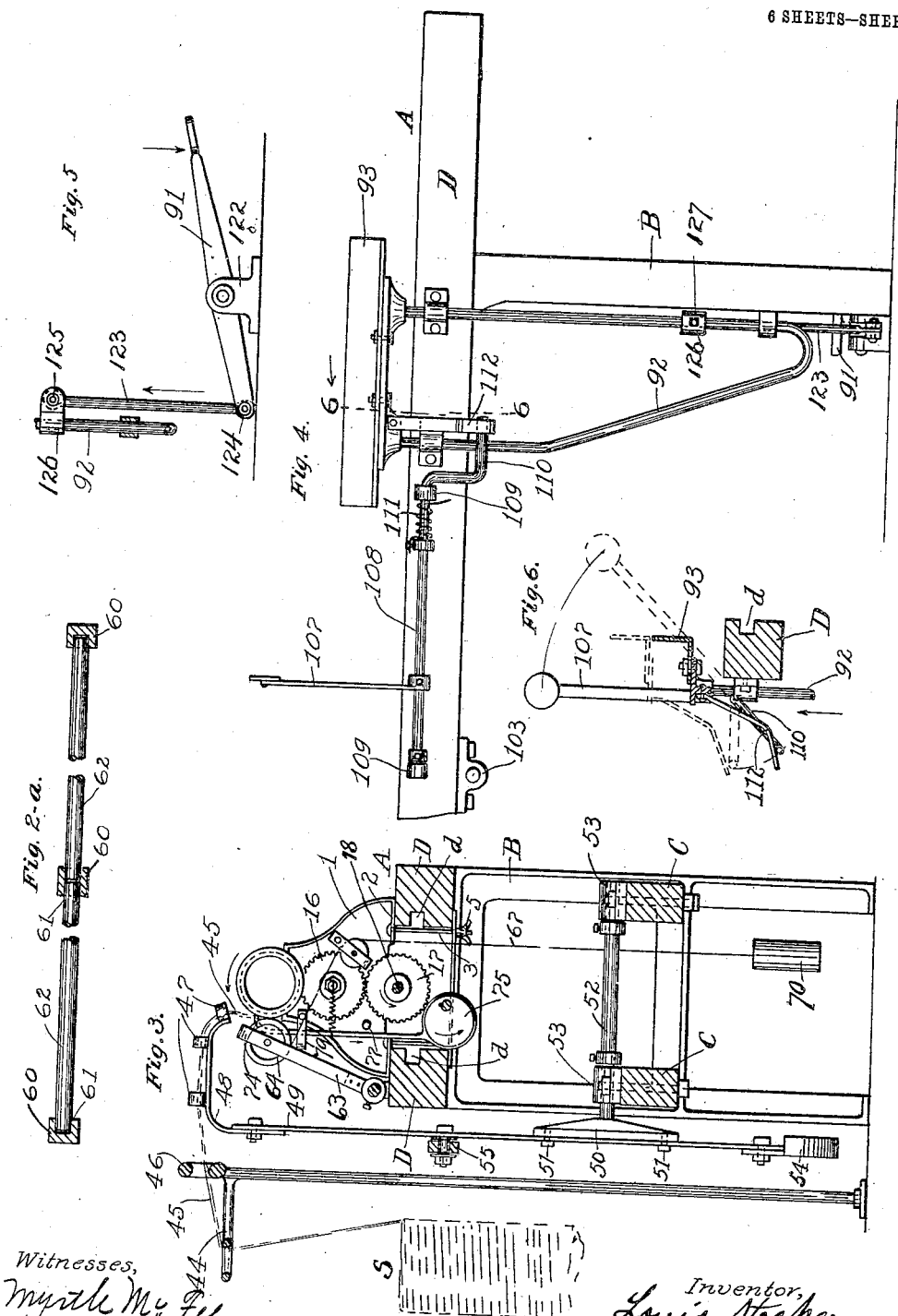
Witnesses,
Myrtle M. Fel.
William Whaley
Inventor,
Louis Stocker
By Cyrus Kehr,
Attorney

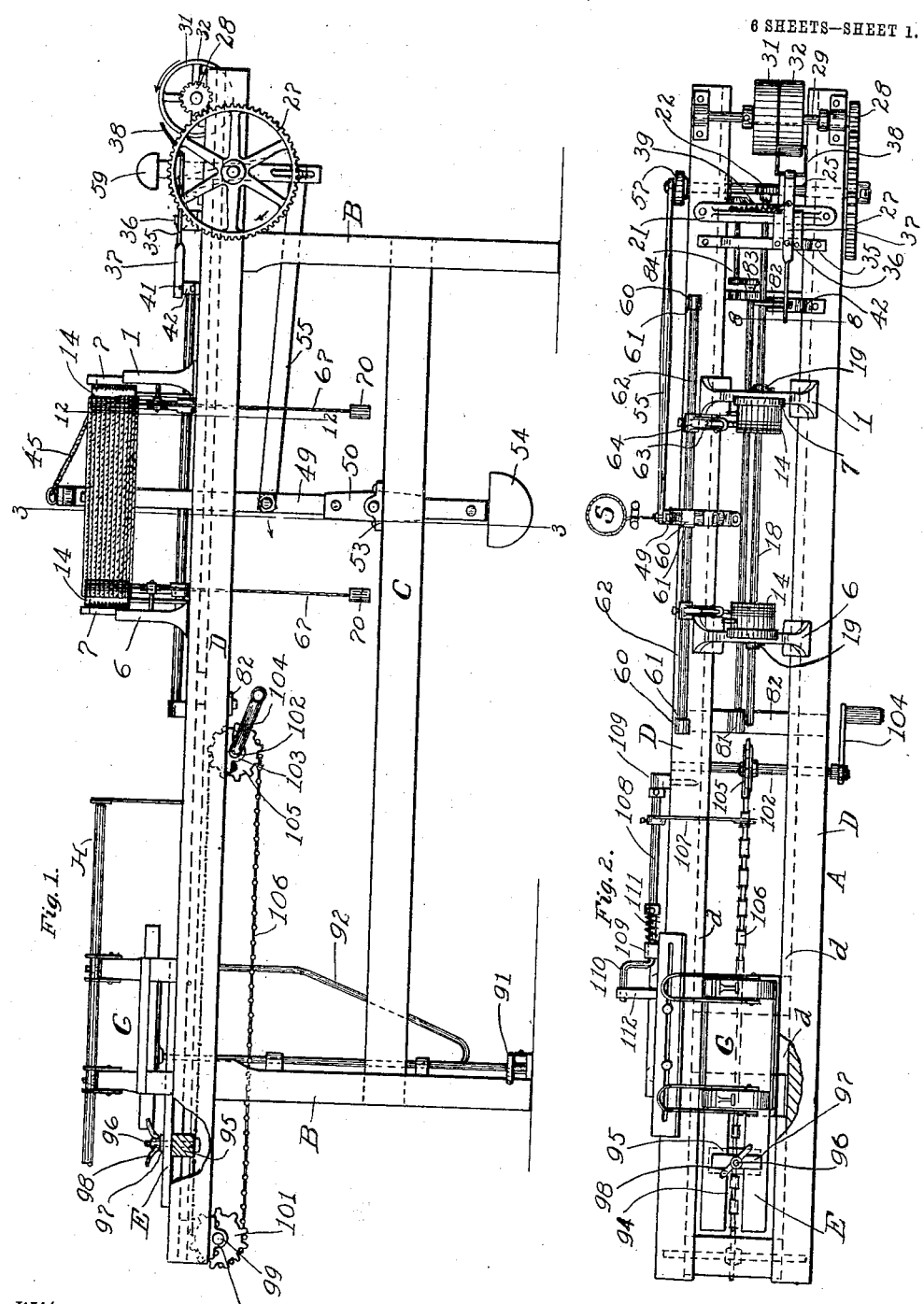

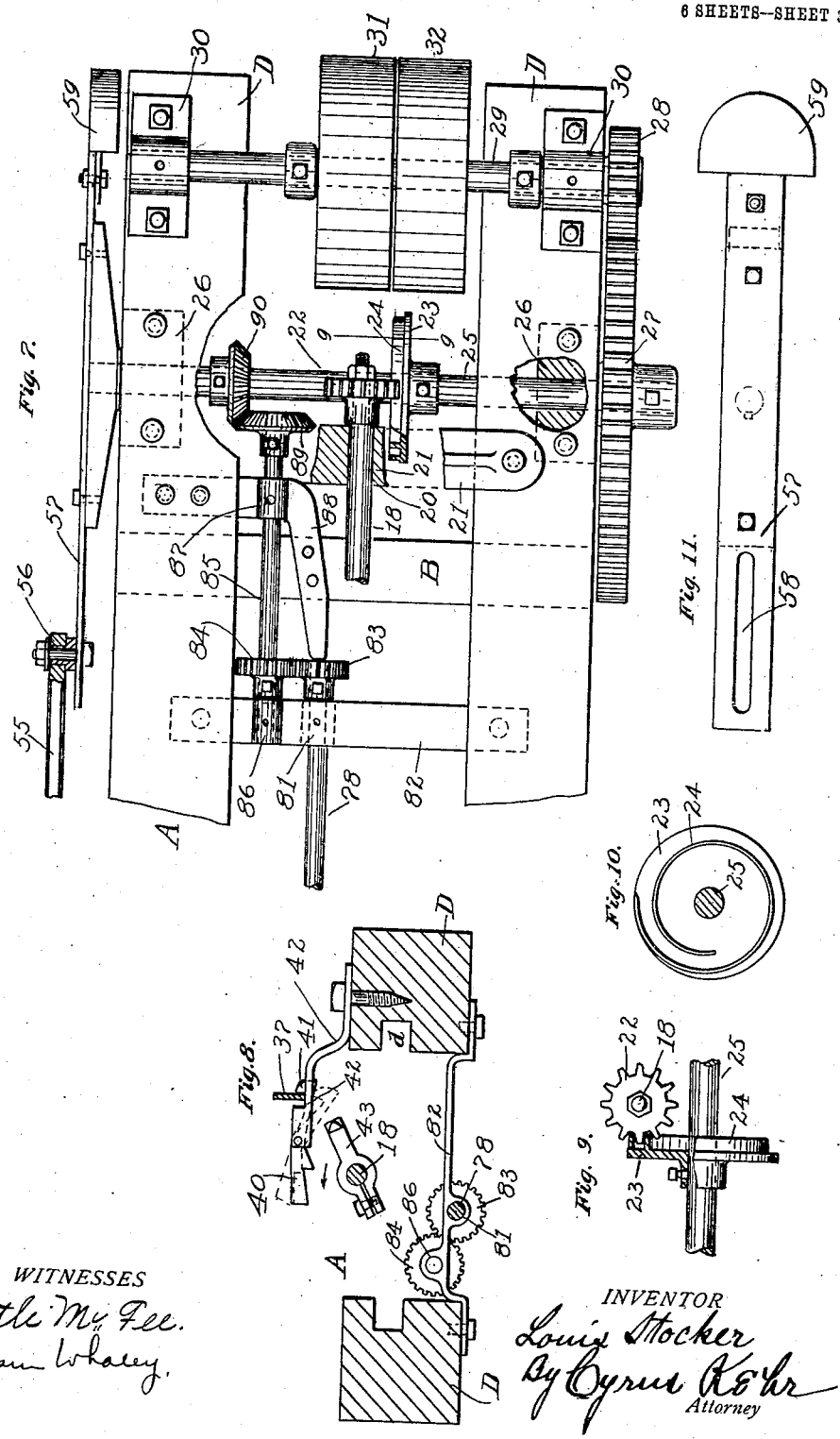

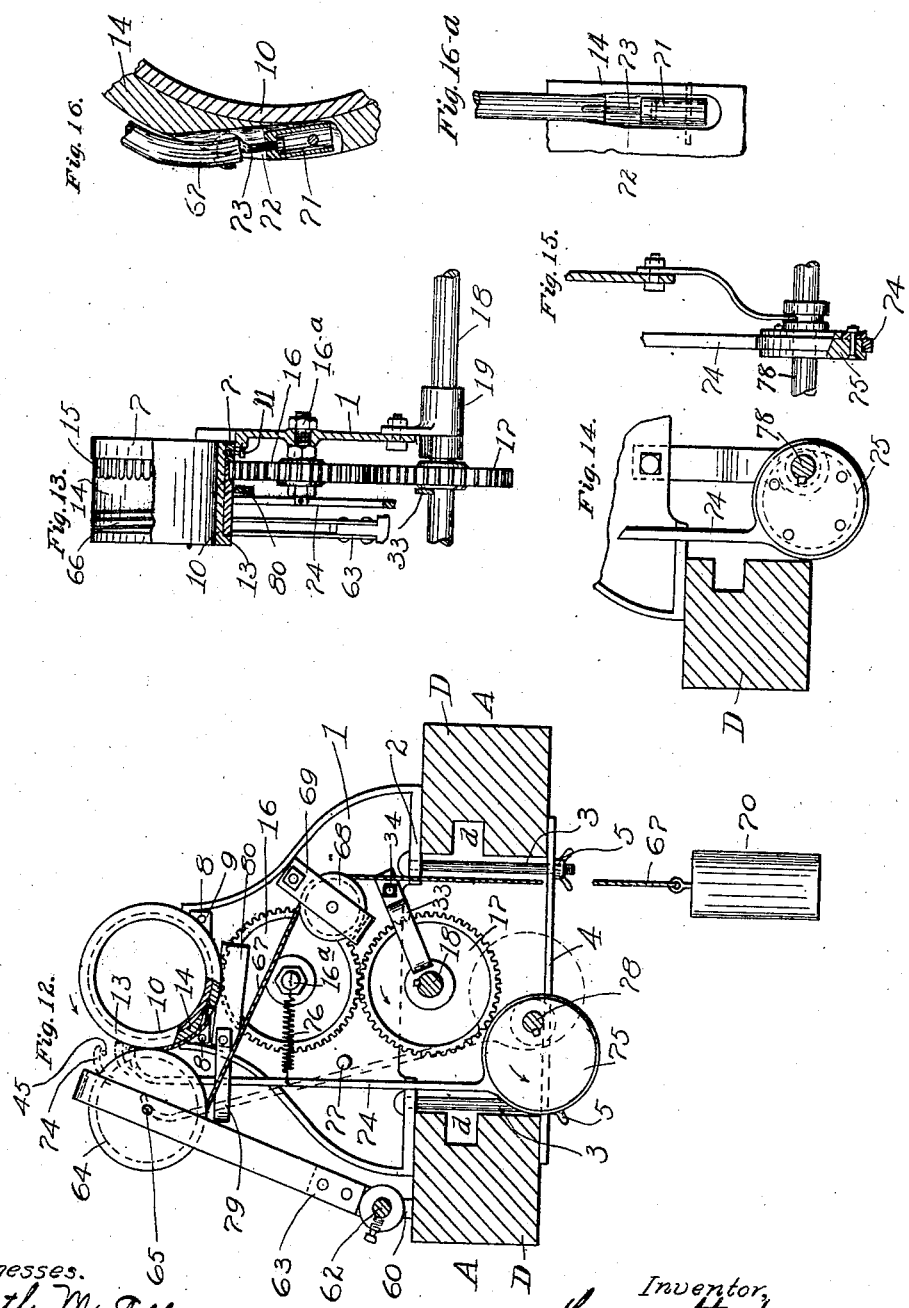

No. 891,571.
PATENTED JUNE 23, 1908.
L. STOCKER.
MACHINE FOR MAKING MOPS AND BRUSHES.
APPLICATION FILED SEPT. 17, 1906.
6 SHEETS—SHEET 5.
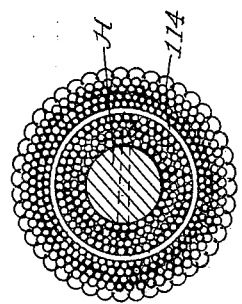
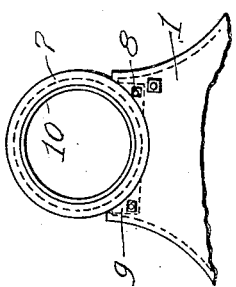
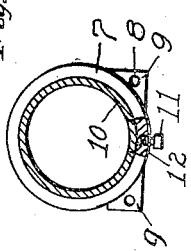
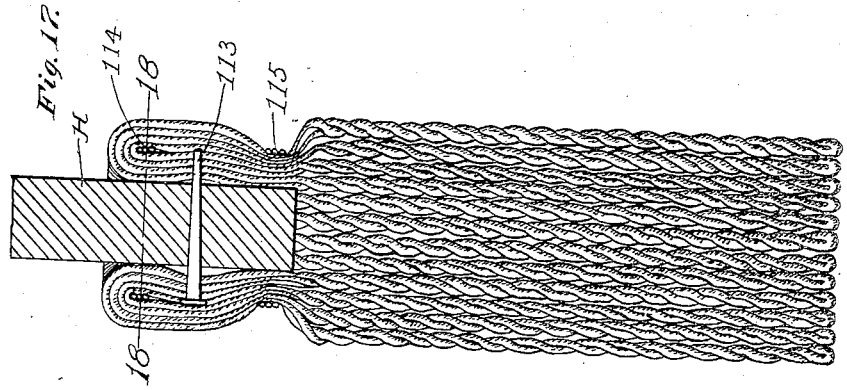
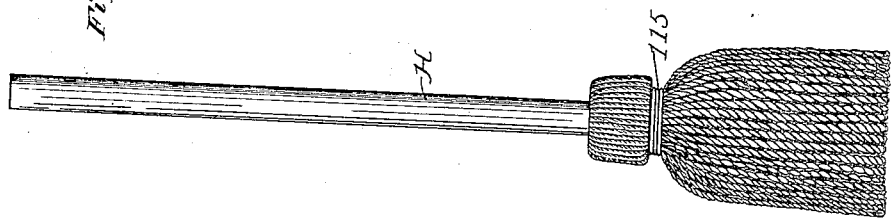
WITNESSES
Myrtle M. Fell.
William Whaley
INVENTOR
Louis Stocker
By Cyrus Kehr,
Attorney No. 891,571.
PATENTED JUNE 23, 1908.
L. STOCKER.
MACHINE FOR MAKING MOPS AND BRUSHES.
APPLICATION FILED SEPT. 17, 1906.
6 SHEETS—SHEET 6.
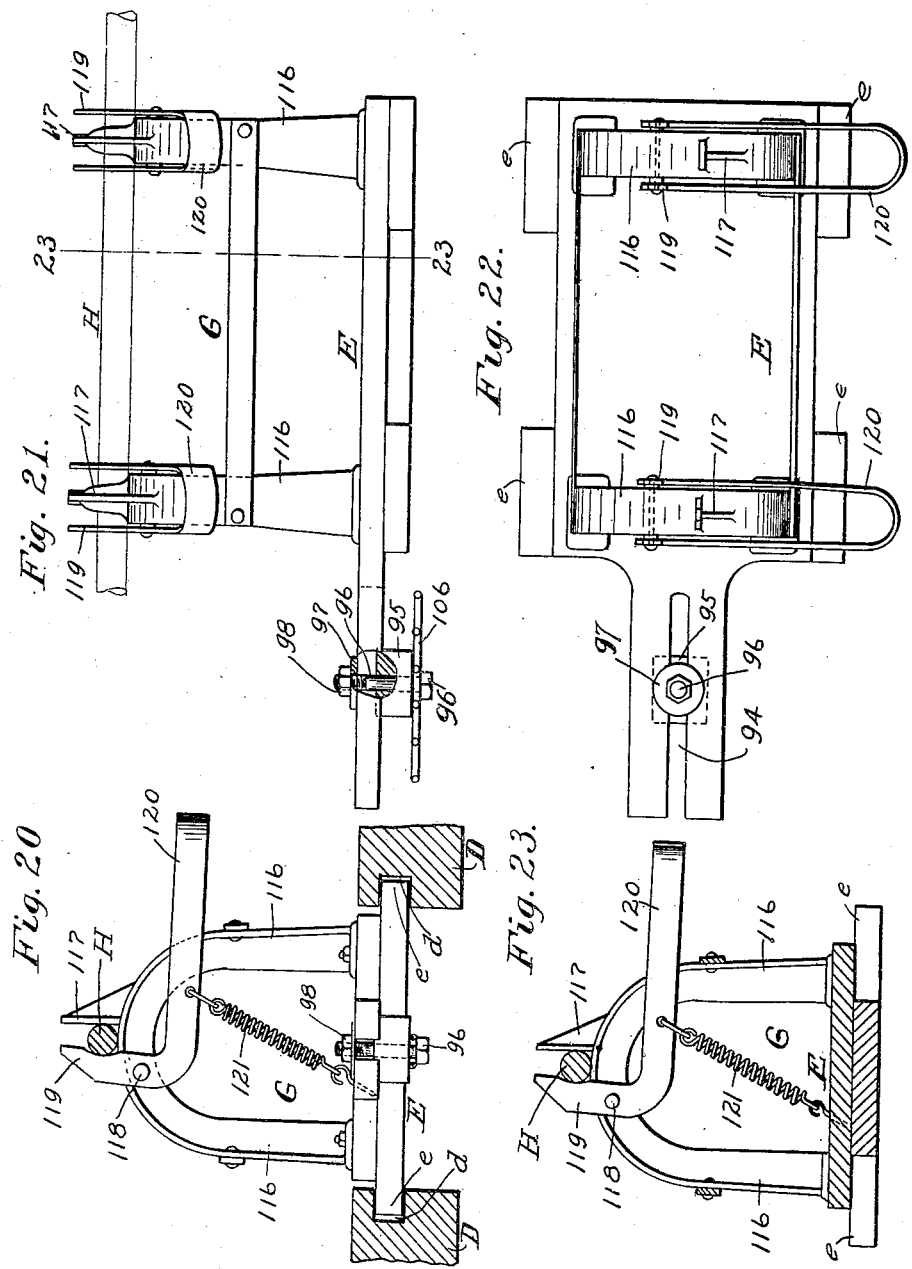
Witnesses
Carrie R. Ivy
William Whaley
Inventor,
Louis Stocker
By Cyrus Kehr
Attorney.

UNITED STATES PATENT OFFICE.

LOUIS STOCKER, OF KNOXVILLE, TENNESSEE, ASSIGNOR TO MYER BRIDGES COMPANY, OF LOUISVILLE, KENTUCKY, A CORPORATION.

MACHINE FOR MAKING MOPS AND BRUSHES.

No. 891,571.  Specification of Letters Patent.  Patented June 23, 1908.

Application filed September 17, 1906. Serial No. 334,977.

*To all whom it may concern:*

Be it known that I, LOUIS STOCKER, a citizen of the United States, residing at Knoxville, in the county of Knox and State of Tennessee, have invented a new and useful Improvement in Machines for Making Mops and Brushes, of which the following is a specification, reference being had to the accompanying drawing.

My invention relates to machines for making mops and similar articles, the heads of which are composed of cords or devices resembling cords; and the invention relates particularly to machines for making such mops and similar articles of one or more long cords folded upon itself or each other and secured to the mop handle to form the mop head.

In the following description, the term, cord or cords, will be applied to cords, strings, yarns, wires, straps and any other similar devices or material suitable for forming the head of a mop or brush.

The object of the invention is to provide automatic mechanism for folding a long cord back and forth upon itself and arranging the folds thus formed approximately parallel to each other in a tubular group or mass around a cylindric space into which the end of the mop handle may extend and be secured to said group of folds by passing any desired number of bands or similar devices around said group of folds, concentric with the handle, whereby said folds are tightly pressed against the mop handle.

In the accompanying drawings, Figure 1 is a front elevation of a machine embodying my improvement; Fig. 2 is a plan of the same machine; Fig. 2$^a$ is a detail of a portion of the mechanism at the rear of the cord abutments. Fig. 3 is a section on the line 3—3 of Fig. 1, looking toward the right; Fig. 4 is a rear view of the left hand end of the machine (as seen in Fig. 1); Fig. 5 is a detail of pedal mechanism appearing in the lower part of Fig. 4; Fig. 6 is a section on the line 6—6 of Fig. 4; Fig. 7 is a detail plan of the right hand end of the machine; Fig. 8 is a section on the line 8—8 of Fig. 2; Fig. 9 is a section on the line 9—9 of Fig. 7, looking toward the left; Fig. 10 is an elevation of the cam shown in Fig. 9; Fig. 11 is a rear view of the crank appearing at the rear in Fig. 7; Fig. 12 is an enlarged section on the line 12—12 of Fig. 1; Fig. 12$^a$ is a detail elevation of one of the abutment-supporting rings. Fig. 13 is a sectional detail illustrating one of the tubular abutments; Fig. 13$^a$ is an end elevation of the cord abutment shown in Fig. 13; Fig. 14 is a detail of a cam which controls a hook for drawing the folded cord; Fig. 15 is a front elevation of the mechanism shown in Fig. 14; Fig. 16 is a sectional detail of mechanism for gripping the end of the cord to one of the tubular abutments; Fig. 16$^a$ is a detail of the attachment of a binding strap to one of the cord abutments; Figs. 17, 18, and 19 illustrate the mop head formed by means of my improved machine, Fig. 17 being a longitudinal section, Fig. 18 a section on the line, 18—18, of Fig. 17, and Fig. 19, a side elevation of the finished mop. Fig. 20 is a detail end elevation, Fig. 21 is a side elevation, and Fig. 22 is a plan of mechanism for gripping the mop handle; Fig. 23 is a section on the line 23—23 of Fig. 21.

By way of general description, it may be stated that the machine comprises two abutments which are in the form of cylindrical tubes and axially in line with each other and in operative relation with mechanism for imparting synchronous rotation to the said abutments in the same direction while the cord is being applied thereto; and associated with said abutments are mechanisms for gripping one end of a long cord to the exterior of one of said abutments, and mechanism for leading the cord to and over the exterior of the other abutment parallel to the axial line of said abutments, and thence back again to and over the exterior face of the first abutment and thence back again to and over the exterior of the second abutment, and so on until the exterior faces of the abutments are covered with portions of the cord which are parallel to each other and the axial line of said abutments and equi-distant from said axial line, so that said cord constitutes a tubular group or mass of folds, said mass being concentric to said axial line. Associated with each of said tubular abutments is mechanism for engaging the cord at each fold of the latter and holding the same until the mass of folded cord has been secured to the mop handle.

A horizontal frame, A, supports the operative mechanism. Said frame is supported upon frame-form standards, B. Two horizontal parallel bars, C, join the standards, B. The frame, A, has two parallel rails, D, the opposing faces of which have a groove, d.

Near the right hand end of the machine, a standard, 1, extends transversely across the frame, A, and rests upon the upper face of the rails, D. Adjacent the inner face of each rail, D, a bolt, 3, extends downward through a flange, 2, at the base of said standard and thence downward through a clamping bar, 4. To the lower end of each bolt is applied a nut, 5, by means of which said clamping bar may be forced upward and said standard downward so that said two members are immovably clamped to the rails, D. For the purposes of adjustment, said bolts may be loosened and said standard and said clamping bar and said bolts shifted upon the rails, D, parallel to the length of the latter. To the left of the standard, 1, is a similar standard, 6. Said standard, 6, and the parts used for securing the same to the rails, D, are duplicates of the standard, 1, and the parts for securing the latter to the rails, D.

Upon the upper portion of the standard, 1, is mounted a ring, 7, the axis of which is parallel to the length of the frame of the machine. Said ring is secured by bolts, 8, extending through ears, 9, applied to the ring. Figs. 13, 13ª, and 12ª. A short cylindrical tube, 10, is inserted into said ring, the exterior of said tube fitting closely into said ring. A set-screw, 11, extends through a flange, 12, on the ring, 7, and bears against said tube and binds the latter immovably, as shown in Fig. 12ª. At its left end, said tube, 10, has an external annular flange, 13 (see Fig. 13.)

Between the ring, 7, and the flange, 13, said tube, 10, is surrounded by a rotary tubular or barrel-form abutment, 14. At the right, the exterior of said abutment is provided with spur gear teeth, 15, which mesh with the idle spur gear wheel, 16, supported by the standard, 1, and said idle spur gear in turn meshes with a spur gear, 17, keyed slidably upon the horizontal rotary shaft, 18, which shaft is supported in bearings, 19, extending downward from the standards, 1 and 6, and a bearing, 20, formed in the lower portion of a bridge-piece, 21, located at the right hand end of the frame, A. 'See Figs. 12, 13, and 7). At the right of said bearing, 20, said shaft, 18, is surrounded by a spur gear wheel, 22, which spur gear is in engagement with a cam wheel, 23, having a helical flange, 24. Said cam wheel is mounted upon a cross shaft, 25, which stands at right angles to the shaft, 18, and is supported in bearings, 26, secured to the bottom of the rails, D. On the front end of said cross shaft, 25, is a relatively large spur gear wheel, 27, meshing with a smaller spur gear wheel, 28, on a similar cross shaft, 29, resting in bearings, 30, on top of the rails, D. A loose pulley, 31, and a driving pulley, 32, surround said shaft, 29, and an ordinary driving belt, (not shown) is applied to said pulleys, whereby power may be transmitted to the shaft, 29, and thence through the gears, 28 and 27, to the shaft, 25, and from the latter through the cam wheel, 23, and the spur gear, 22, to the shaft, 18, a reduction of velocity being effected by said cam and spur wheel. Thus it will be seen that, so long as the driving belt is on the driving pulley, 32, the abutment, 14, will be slowly rotated.

The standard, 6, supports a ring and a tube which are duplicates of the ring, 7, and the tube, 10, supported by the standard, 1; but the ring and tube on the standard, 6, are reversed in direction with reference to the corresponding parts on the standard, 1, so that said rings and said tubes stand opposed to each other. And the tube on the standard, 6, is surrounded by an abutment corresponding to the abutment, 14, on the standard, 1, and is surrounded at its left hand end by spur gear teeth meshing with an idle spur gear wheel, which meshes with a spur gear wheel corresponding to the spur gear wheel, 17, slidably surrounding the shaft, 18. And the gears, 17, 16, and 15 bear to each other the same ratios as do the similar gears adjacent the standard, 1. Thus it will be seen that the slow rotation of the shaft, 18, will cause the synchronous rotation, at a slow velocity, of the two abutments, 14, in the same direction.

Each spur gear wheel, 17, bears against the adjacent bearing, 19, and at its opposite side said gear is retained by a finger, 33, secured to the adjacent standard (1 or 6) by a bolt, 34, said finger bearing against the adjacent end of the hub of said gear, 17. By this means, the gear, 17, is shifted upon the shaft, 18, when the adjacent standard is shifted lengthwise upon the rails, D, whereby the gears, 17 and 16, are constantly kept in engagement. The purpose of the adjustment of said standards is to bring them nearer to or farther from each other, in order that the folds of the cord which is to form the head of the mop may be made shorter or longer.

The folds of the cord are, as already herein stated, applied back and forth parallel to the axial line of the abutments entirely around said abutments, so that a full rotation (and no more) of said abutments is necessary for the forming of each mop head. After said folds have been so applied to said abutments, the mop handle is inserted endwise along the axial line of said abutments and said folds tied to said handle, as will be more fully hereinafter described. (It might be inserted previously). For such insertion of the handle and the tying of said folds, it is necessary that the rotation of the abutments be suspended. Hence the power belt must be shifted from the driving pulley, 32, to the loose pulley, 31, after each full rotation of said abutments. The gear wheel, 17, and the ring of spur gear teeth, 15, on the abutments are of equal diameters. Hence one complete rotation of the shaft, 18, will impart one complete rotation to said abutments. Hence the shaft, 18, must be stopped after each full rotation. In other words, the belt must be shifted after each full rotation of the shaft, 18. This is accomplished by means of the belt-shifting mechanism to be next described. (See the right hand portion of Figs. 1 and 2 and the section constituting Fig. 8.)

At the left of the bridge-piece, 21, is a bridge-piece, 35; and upon said bridge piece, upon an upright axis at 36 is pivoted an arm, 37, which is approximately parallel to the length of the machine. At its right hand end, said bar supports a stirrup, 38, through which the power belt extends. Between said stirrup and said pivot a contracting coiled spring, 39, is secured by one end to said bar and by its other end, at a point rearward of said bar, to the bridge-piece, 21, so that said spring tends to draw the right hand end of said bar, with the stirrup, 38, rearward toward the loose pulley, 31. Thus the left hand or free end of said bar, 37, tends to move forward. Normally it is held against such movement by means of a latch bar, 40, having at its forward end an upward directed hook, 41. Said latch bar is pivoted to a bracket, 42, extending rearward from the upper face of the front rail, D. To the shaft 18, is clamped an arm, 43, which is of proper length to bear against the rear end of said latch bar when the shaft, 18, rotates. Said arm, 43, is set in proper radial position upon said shaft, 18, to cause the tilting of said latch bar, and the consequent release of the bar, 37, at the precise time chosen for the stopping of said abutments.

S is a spool or bale of cord from which the mop heads are to be formed. In the form shown in the drawings, said spool is an upright cylinder. Directly above said spool is a stationary cord guide, 44, through which the cord, 45, passes. Thence said cord extends horizontally through another stationary guide, 46. Thence the cord extends through three guides, 47, which are mounted upon an arm, 48, which is adjustably secured to the upper end of an upright oscillating bar, 49. By means of said oscillating bar, said arm, 48, and the guides, 47, are moved from right to left far enough to pass to the right of the right hand abutment and to the left of the left hand abutment. Said arm and said bar together constitute a member for leading the cord back and forth from one abutment to the other to form the folds of the cord. Said bar, 49, is secured to a cross-head, 50, by means of bolts, 51, and said cross-head is secured rigidly to a shaft, 52, resting in bearings, 53, supported upon the horizontal bars, C, of the frame, A. By this means, said bar, 49, is firmly mounted in such manner as to permit oscillation in a plane which is upright and parallel to the length of the machine. A counter-weight, 54, may be applied to the lower end of said bar, 49. Above the shaft, 52, a pitman, 55, is hinged by one end to said bar, 49. The opposite end of said pitman surrounds a wrist pin, 56, on a crank, 57, said crank being mounted upon the rear end of the cross shaft, 25, (see Fig. 7). The wrist pin, 56, is adjustable in a slot, 58, in said crank, (Fig. 11) whereby the length of stroke of said pitman may be varied. The arm forming the crank, 57, may be extended beyond the shaft, 25, and such extension provided with a counterweight, 59.

From the foregoing it will be seen that with each rotation of the shaft, 25, the arm, 49, will be given one oscillation and the cord passing through the guides, 47, will be carried from one abutment to the other abutment and back again to the first abutment, whereby one fold of said cord is formed. It will also be observed that inasmuch as the shaft, 18, rotates at a reduced velocity, the arm, 48, will cause the forming of a plurality of cord folds during each rotation of the abutments. The number of such folds placed upon the abutments during such rotation depends upon the ratio of the spur gear wheel, 22, to the cam wheel, 23, (see Figs. 7, 9, and 10). Increasing the number of teeth on said spur gear wheel, 22, reduces the velocity of rotation of said abutments and reducing the number of teeth upon said wheel increases such velocity. Hence the number of folds placed into the mop heads may be varied by removing one spur gear wheel, 22, and putting into its place another similar spur gear wheel having more or fewer teeth. When such substitution is made, the cam wheel, 24, is shifted as far as may be needed upon the shaft, 25.

Associated with each abutment is mechanism for holding the end of the cord from which a new head is to be made and for holding each subsequent section or fold of the cord as fast as it is applied to the abutment, and mechanism around which the cord is doubled for making the folds. Upon the rear rail equi-distant from the two abutments, a short standard, 60, rises from the rear rail, D, and supports a bearing, 61, which is horizontal and parallel to the length of the machine, and at the right of the right hand abutment and at the left of the left hand abutment is a similar standard, 60, supporting a similar bearing, 61, axially in line with the first mentioned bearing, 61. (See Figs. 1, 2, 2ª and 12). At each side of said middle bearing, 61, is a rock shaft, 62, having its ends resting in said bearings, the middle of said bearings serving to support the adjacent and abutting ends of said rock shafts. Thus each rock shaft is free to turn independently of the other. The right hand and the left hand bearings, 61, have closed ends, as shown in Fig. 2ª.

Opposite the end of each abutment which is adjacent the flange, 13, an arm, 63, is rigidly secured to the adjacent rock shaft, and the upper end of said arm supports a grooved roller, 64, on an axis at 65, which is parallel to the axis of the abutments, so that the periphery of the roller, 64, may bear against the exterior surface of said abutment and be rotated by the rotation of said abutment or by means of the cord to be next described. A spiral groove, 66, is formed in the outer face of said flange, 13, and the end of a cylindrical cord or strap, 67, is attached by one end to said abutment in the portion of said groove nearest said flange, and extends thence upward over and around said grooved roller, 64, and thence forward over a guide, 68, held by a bracket, 69, and extends thence downward and supports a weight, 70, by means of which said strap is kept under tension, and putting said strap under tension draws the roller, 64, and the arm, 63, toward said abutment. When the abutment is rotated in the direction of the arrow (see Fig. 12), the end of said strap attached to said abutment is drawn downward and carried around the abutment axis in the direction of the arrow, so that said strap becomes wound around said abutment, following said spiral groove, 66, said groove having the effect of guiding said strap so as to avoid overlapping and of adapting said strap to make stronger engagement of the mop cord when the latter lies between said strap and the abutment.

For the attachment of the strap, 67, a swivel-block, 71, is pivoted within a recess, 72, formed in the wall of the abutment and to said swivel-block is attached a swivel-hook, 73, and said hook extends through the adjacent end of said strap. Said swivel-block being thus hinged, the strap is free to be drawn in the direction of the opposite abutment and over the adjacent flange, 13, when the mop handle is drawn endwise for the releasing of the mop head from the abutments, whereupon the weight, 70, will draw the upper end of said strap taut and cause it to again assume the position shown in Fig. 12.

In beginning the operation of applying the cord to form a mop head, the end of the cord is laid between one of the straps, 67, and the adjacent face of the abutment, whereby said end of the cord is clamped to a degree depending upon the size and form of the strap and the groove, 66, and the amount of the weight, 70. The machine is now ready to lead the cord thence to the next abutment, where the cord must be laid against the face of said abutment and doubled back again to the first abutment. To engage said cord at the point where it is to be doubled or folded for returning to the first abutment, an automatic reciprocating finger, 74, is applied to each abutment. Each such finger is actuated and controlled by an eccentric, 75, a contracting coiled spring, 76, attached by one end to said finger between the free end of the latter and said eccentric and attached by its other end to the wrist, 16ª, which supports the idle spur gear wheel, 16, and a fulcrum, 77. The action of said spring, 76, is to draw the free end of said finger toward the abutment; but when the eccentric, 75, is forward of its shaft, 78, as shown by dotted lines in Fig. 12, the lower portion of said finger is carried forward and its middle portion made to bear against the fulcrum, 77, whereby said finger is turned upon said fulcrum, the free end of said finger being drawn away from the adjacent abutment. The eccentric turns in the direction shown by the arrow and draws said finger downward at the same time that it is thus tilted.

When the cord, 45, is in position to be doubled, as already described, the free end of the finger, 74, extends just above said cord and is then moved downward into contact with the exterior face of the abutment and then drawn along said face far enough to bring said cord into engagement between the abutment and the grooved roller, 64, and the binding strap, 67. Then said end of said finger moves rearward away from said abutment and passes thence upward into position for again doubling the cord, 45. (Said end traverses substantially an elliptical path, excepting that the forward portion of said path is deflected rearward by the rear surface of the abutment.) Said finger and the arm, 48, are so timed as to properly coöperate, the free end of the finger moving downward over the cord as often as the arm, 48, has reached its adjacent limit of movement, said finger then moving downward and bearing against the abutment, and said arm then returning in the opposite direction, whereby the cord is folded around said finger, each fold of the cord being drawn downward by the finger and engaged between the strap, 67, and the abutment, 14, after which the free end of the finger is drawn rearward out of engagement with said cord. To prevent said finger from deflecting laterally in a direction parallel to the length of the machine, a yoke, 79, is secured to the adjacent standard, 1 or 6, and made to loosely extend around the sides of said finger.

To prevent the mop cord, 45, from reaching into the grasp of the gear wheel, 16, and the circle of spur gear teeth, 15, a stationary guard, 80, is attached to the adjacent standard between said gears and the adjacent finger, 74. Such a guard is, of course, not needed if the said finger is always kept far enough from said gears.

The shaft, 78, which bears the eccentric, 75, extends parallel to the length of the machine and rests in bearings, 81, on bridge-pieces, 82. To the right hand end of said shaft, 78, is applied a spur gear wheel, 83, which meshes with a similar spur gear wheel, 84, mounted on a shaft, 85, which is parallel to the shaft, 78, and has its left hand end resting in a bearing, 86, on a bridge-piece, 82, while its right hand portion is supported in a bearing, 87, on a bracket, 88. To the right hand end of said shaft, 85, is applied a bevel gear, 89, which meshes with a bevel gear, 90, on the shaft, 25. By means of said gears and shafts, said eccentric, 75, is rotated whenever the driving pulley, 32, is in action.

When the operation has been conducted long enough to impart to the abutments a complete rotation and cause the shifting of the belt from the driving pulley so as to stop, the mop cord is then cut between the arm, 48, and the nearest abutment, 14, all portions of the cord then surrounding the abutments being at such time held by the straps, 67. Then the mop handle, H, must be brought into the tubular group of cord sections surrounding said abutments, (if this has not been previously done) said handle being preferably placed into the axial line of said abutments. This may be done manually or by means of clamping or supporting mechanism mounted upon a carriage which is reciprocable parallel to the length of the machine.

The carriage comprises a base plate E provided with laterally directed arms, $e$, extending into grooves, $d$, in the side rails, D. Two inverted U-shape standards, 116, rest upon said carriage parallel to each other and in planes transverse to the machine axis, and directly beneath the machine axis (the axis of the tubes, 10, and rings, 7) and away from the latter a distance equal to one-half the diameter of one of the mop handles, so that a handle may rest upon said standard and be at the same time axially in line with the machine axis. Rearward of the machine axis, a stationary jaw, 117, rises from each such standard in proper position to bear against the handle while the latter is axially in line with the machine axis. Pivoted to the front portion of said standard at 118 is a bell-crank lever, 119, 120, the number, 119, designating an upright arm and the number, 120, designating a horizontal arm of said bell-crank, said upright arm constituting a jaw standing in front of the axial line of the machine in proper position to bear against the front of the handle. A contracting coiled spring, 121, is joined by its upper end to the arm, 120, and by its lower end to the base plate, E, so as to normally draw said arm, 120, downward and tilt said bell-crank so as to press the jaw arm, 119, toward the stationary jaw, 117. Preferably two such bell-cranks are applied to each standard, 116, one at the right and one at the left of said standard, the pair being integral, being formed of a single bar of metal bent into U-form as shown by the drawings (Figs. 22 and 23). Obviously, the jaws, 119, may be moved forward manually or by any suitable mechanical devices placed in suitable operative relation with said jaws. For the releasing of said jaws, the drawings show a pedal mechanism. Said pedal mechanism comprises an upright reciprocatory member, 92, and a foot lever, 91. Said upright member supports at its upper end a horizontal bar, 93, which is horizontal and parallel to the machine axis and normally extends to the level of the lower face of the rear ends of the bell-crank arms, 120, when the handle is located between the jaws, 117 and 119, and said horizontal arm, 120, is raised to the extent due to the forward movement of the jaw, 119, by the insertion of the handle.

The bar, 93, may be regarded as a part of the member, 92, and said bar and the upright portions of said member may be integral.

Adjacent the lower portion of the member, 92, a pedal lever, 91, is pivoted between its ends to a support, 122, the free end of said pedal lever extending forward into convenient position for the attendant, while the opposite or rear end of said pedal lever is suitably coupled to the lower portion of said member, 92. In the form shown in the drawings, this is done by means of a supplemental link, 123, the lower end of which is joined to said pedal lever at 124 while its upper end is pivoted at 125 to a block, 126, surrounding one of the upright bars of the member, 92, and secured thereto by means of a set-bolt, 127. The operation of said handle-supporting mechanism is as follows: If the carriage is not at its right hand limit of movement and no handle is in position between the jaws of said mechanism, said jaws are separated manually and a handle placed into position. This is done to raise the lower ends of the arms, 120, of the bell-cranks so that when the carriage is moved to its right hand limit, the arms, 120, will pass above the bar, 93, said bar being long enough to extend beneath both arms, 120. Obviously, the rear ends of said arms may be in any other manner raised so as to clear said bar. When said arms are once in position above said bar, said bar may be raised for the tilting of said bell-cranks and the placing of said handle at the proper distance from the longitudinal middle of the carriage for the insertion of another handle. When the pressure of the foot is removed from the pedal, 91, the member, 92, and the bar, 93, will descend by gravity and each bell-crank will be reversed (with reference to the movement imparted thereto by the bar, 93) by the action of the contracting springs, 121, whereby the jaws, 119, will press the handle against the jaws, 117, and grip said handle until said bar, 93, is again raised, which is done after the carriage is moved to its left hand limit and again returned to its right hand limit. Said carriage is made reciprocable by means as follows: At the left of said clamping mechanism, the carriage is provided with a longitudinal slot, 94. Beneath said slot is a block, 95, and a bolt, 96, extends upward through said block and slot and through a clamping bar, 97, and surrounded at its upper end by a nut, 98. By tightening said bolt, said block and bar are securely clamped to said carriage. When the bolt is loosened, the said parts may be shifted longitudinally upon the carriage and secured in a new position.

Beneath the left hand end of the rails, D, is a cross-shaft, 99, resting in bearings, 100, and said shaft is surrounded by a sprocket wheel, 101. At the right of the limit of movement of said carriage is a shaft, 102, supported in bearings, 103, and having at its front end a crank, 104. Between its bearings said shaft is surrounded by a sprocket wheel, 105, corresponding to the sprocket wheel, 101. An endless sprocket chain, 106, surrounds said sprocket wheels and is suitably attached to said block, 95, so that by turning said crank said carriage may be reciprocated.

Gage mechanism for determining the position for the head end of the mop is illustrated in Figs. 1, 2, 4, and 6. An upright gage arm, 107, is mounted upon a horizontal rock-shaft, 108, resting in bearings, 109, applied to the rear of the frame, A, adjacent the member, 92. On the end of said shaft next said member is a crank, 110, and a torsional spring, 111, is applied to said rock-shaft in such manner as to turn said shaft in the proper direction to move said gage arm forward into the axial line of the machine. The cam arm, 112, extends obliquely downward and rearward from the upper portion of the member, 92, and normally stands low enough to hold the crank, 110, in its lower position, the gage arm being then in its rear position or position of rest. With the upward motion of the member, 92, for the opening of the handle-clamping mechanism to receive the handle, said cam arm rises and leaves the rock-shaft, 108, free to undergo a partial rotation in response to the strain of the spring, 111, whereby said gage arm is turned forward into the axial line of the machine. Then the mop handle may be inserted into the handle clamping mechanism, the handle being moved toward the right (as shown in Fig. 1) until it rests against said gage arm. Then, upon releasing the pedal lever, 91, for the closing of the handle clamping mechanism, the member, 92, and the cam arm, 112, will descend and press the crank, 110, downward, whereby the gage arm is turned rearward out of the way of the mop handle and the handle-clamping mechanism.

The manner of securing the folded cord to the mop handle may be varied. Figs. 17, 18, and 19 illustrate one form. A nail, 113, is put transversely through the handle and the group of cord folds, the ends of the nail protruding outside of the handle. Then a band, 114, is placed around the handle of the group of folds above said nail. Then the portions of the cord above said band are drawn over the portions of said folds below said nail and a band, 115, placed around all of said folds. The drawing of the upper portion of said folds into position preparatory to the application of said second band may be accomplished by drawing the handle to the left through the left hand abutment (Figs. 1 and 2), while the folds are still engaged by the left hand abutment and strap, 67.

I claim as my invention:

1. In a machine of the nature described, a support for receiving the folds of a mop cord to provide a space adapted to receive a mop handle, and retaining means for said cord disposed on said support.

2. In a machine of the nature described, an open ended support having retaining means for holding the folds of a mop cord surrounding a space adapted to receive a mop handle.

3. In a machine of the nature described, a support mounted for rotary travel and having retaining means for holding the folds of a mop cord thereon to provide a space adapted to receive a mop handle.

4. In a machine of the nature described, mechanism for receiving and holding the folds of the mop cord surrounding a space adapted to receive a mop handle, said mechanism comprising two members separated from each other to permit the movement of the cords between said members toward and against said handle, substantially as described.

5. In a machine of the nature described, mechanism for receiving and holding the folds of the mop cord, said mechanism comprising two abutments one of which has an axial opening large enough to permit the passage of the mop handle and the folded cords secured to said handle, substantially as described.

6. In a machine of the nature described, two abutments axially in line and provided with means for receiving and holding the folds of the mop cord, substantially as described.

7. In a machine of the nature described, two rotary abutments axially in line and provided with means for receiving and holding the folds of the mop cord, substantially as described.

8. In a machine of the nature described, two abutments axially in line and provided with means for receiving and holding the folds of the mop cord, and means for rotating said abutments, substantially as described.

9. In a machine of the nature described, two cylindrical abutments and mechanism for pressing the folds of the mop cord against said abutments, substantially as described.

10. In a machine of the nature described, the combination of mechanism for receiving and holding the folds of the mop cord surrounding a space adapted to receive the mop handle, and mechanism for supporting said handle, substantially as described.

11. In a machine of the nature described, the combination of mechanism for receiving and holding the folds of the mop cord surrounding a space adapted to receive the mop handle, and handle-supporting mechanism, said receiving and holding mechanism and said handle - supporting mechanism being relatively reciprocable, substantially as described.

12. In a machine of the nature described, the combination of mechanism for receiving and holding folds of the mop cord surrounding a space adapted to receive the mop handle, and reciprocable handle-supporting mechanism, substantially as described.

13. In a machine of the nature described, the combination of mechanism for receiving and holding folds of the mop cord surrounding a space adapted to receive the mop handle, handle-supporting mechanism, and gage mechanism to aid in setting the handle in said supporting mechanism, substantially as described.

14. In a machine of the nature described, the combination of mechanism for receiving and holding folds of the mop cord surrounding a space adapted to receive the mop handle, reciprocatory handle-supporting mechanism, and gage mechanism to aid in setting the handle in said supporting mechanism, substantially as described.

15. In a machine of the nature described, the combination of mechanism for receiving and holding folds of the mop cord surrounding a space adapted to receive the mop handle, reciprocatory handle-supporting mechanism, and automatically shiftable gage mechanism to aid in setting the handle in said supporting mechanism, substantially as described.

16. In a machine of the nature described, the combination of mechanism for receiving and holding the folds of the cord surrounding a space adapted to receive the mop handle, and mechanism for presenting the cord to said receiving and holding mechanism, substantially as described.

17. In a machine of the nature described, the combination of mechanism for receiving and holding the folds of the cord surrounding a space adapted to receive a mop handle, and mechanism for presenting the cord to said receiving and holding mechanism, said presenting mechanism and said receiving and holding mechanism being relatively reciprocable, substantially as described.

18. In a machine of the nature described, the combination of rotary mechanism for receiving and holding the folds of the cord surrounding a space adapted to receive a mop handle, and mechanism for presenting the cord to said receiving and holding mechanism, substantially as described.

19. In a machine of the nature described, the combination of mechanism for receiving and holding the folds of the cord surrounding a space adapted to receive a mop handle, and mechanism for presenting the cord to said receiving and holding mechanism, said presenting mechanism comprising a reciprocable cord guide, substantially as described.

20. In a machine of the nature described, the combination of mechanism for receiving and holding the folds of the cord surrounding a space adapted to receive a mop handle, and mechanism for presenting the cord to said receiving and holding mechanism, said presenting mechanism and said receiving and holding mechanism being relatively rotatable, and mechanism adjustable for varying the ratio between the rapidity of said presenting mechanism and the rate of the relative rotation of said mechanisms, substantially as described.

21. In a machine of the nature described, the combination of rotary mechanism for receiving and holding the folds of the cord surrounding a space adapted to receive a mop handle, and mechanism for presenting the cord to said receiving and holding mechanism, and mechanism adjustable for varying the rate of rotation of said receiving and holding mechanism, substantially as described.

22. In a machine of the nature described, mechanism for receiving and holding the folds of the mop cord surrounding a space adapted to receive the mop handle, said receiving and holding mechanism being adjustable for receiving and holding folds of different lengths, substantially as described.

23. In a machine of the nature described, mechanism for receiving and holding the folds of the mop cord surrounding a space adapted to receive a mop handle, said receiving and holding mechanism comprising two abutments relatively adjustable to adapt them to receive and hold longer and shorter cord folds, substantially as described.

24. In a machine of the nature described, the combination of mechanism for receiving and holding the folds of the mop cord surrounding a space adapted to receive a mop handle, mechanism for presenting the cord to said receiving and holding mechanism, and holding and receiving mechanism and said presenting mechanism being relatively reciprocable, and means for varying such relative reciprocation, substantially as described.

25. In a machine of the nature described, the combination of mechanism for receiving and holding the folds of the mop cord surrounding a space adapted to receive the mop handle, devices around which the cord may be folded, and mechanism for leading the cord back and forth to and around said devices, substantially as described.

26. In a machine of the nature described, the combination of mechanism for receiving and holding the folds of the mop cord surrounding a space adapted to receive the mop handle, devices around which the cord may be folded, said devices being automatically shiftable for delivering said folds into the grasp of said receiving and holding mechanism, and mechanism for leading the cord back and forth to and around said devices, substantially as described.

27. In a machine of the nature described, the combination with a frame, of a supporting device having retaining means for holding the folds of a mop cord surrounding a space adapted to receive a mop handle, and means for rotating said support.

28. In a machine of the nature described, the combination with a frame, of a supporting device having retaining means for holding the folds of a mop cord surrounding a space adapted to receive a mop handle, and a handle carriage movable in the plane of the axis of said space.

29. In a machine of the nature described, the combination with a frame, of a supporting device having retaining means for holding the folds of a mop cord surrounding a space adapted to receive a mop handle, movable means adjacent to said support for folding the cord thereon, and means for disposing said cord upon said support.

In testimony whereof I have signed my name, in presence of two witnesses, this 13th day of September, in the year one thousand nine hundred and six.

LOUIS STOCKER.

Witnesses:
  CYRUS KEHR,
  C. A. MORSE.